United States Patent
Bohge et al.

(10) Patent No.: US 10,680,850 B2
(45) Date of Patent: Jun. 9, 2020

(54) COMMUNICATION SYSTEM

(71) Applicant: R3—Reliable Realtime Radio Communications GmbH, Berlin (DE)

(72) Inventors: Mathias Bohge, Berlin (DE); Florian Bonanati, Buchholzer (DE)

(73) Assignee: R3—RELIABLE REALTIME RADIO COMMUNICATIONS GMBH, Berlin (DE)

( * ) Notice: Subject to any disclaimer, the term of this patent is extended or adjusted under 35 U.S.C. 154(b) by 0 days.

(21) Appl. No.: 15/759,657

(22) PCT Filed: Sep. 19, 2016

(86) PCT No.: PCT/EP2016/072195
§ 371 (c)(1),
(2) Date: Mar. 13, 2018

(87) PCT Pub. No.: WO2017/050705
PCT Pub. Date: Mar. 30, 2017

(65) Prior Publication Data
US 2019/0089556 A1   Mar. 21, 2019

(30) Foreign Application Priority Data
Sep. 23, 2015 (EP) .................................... 15186408

(51) Int. Cl.
*H04L 12/437*  (2006.01)
*H04W 72/02*  (2009.01)
(Continued)

(52) U.S. Cl.
CPC .......... *H04L 12/437* (2013.01); *H04L 12/433* (2013.01); *H04W 24/04* (2013.01);
(Continued)

(58) Field of Classification Search
CPC ... H04W 84/18; H04W 72/085; H04W 72/04; H04W 72/02; H04W 72/0406;
(Continued)

(56) References Cited

U.S. PATENT DOCUMENTS 8,533,554 B2   9/2013  Kim et al.
2007/0275756 A1*  11/2007  Choi ..................... H04W 48/10
                                            455/557
(Continued)

FOREIGN PATENT DOCUMENTS

DE   10 2012 206 529 A1   10/2013
GB       2490110 A        10/2012

OTHER PUBLICATIONS

Muhammad Tahir "Wireless Communication Protocols and Resource Optimization for Distributed Control of Power Networks"; UMI Dissertation Publishing; University of Illinois; UMI Microform No. 3345496; pp. 62-64; ProQuest LLC (2009).

(Continued)

*Primary Examiner* — Kevin C. Harper
(74) *Attorney, Agent, or Firm* — Gordon Rees Scully Mansukani LLP

(57) ABSTRACT

The invention relates inter alia to a method of operating a communication system (10). Each communication node (11, 12, 13, 14) of the communication system (10) preferably tracks a successful reception of data signals (D) and requests a switch and/or switches from a currently used communication channel (C1) to another communication channel (C2-C6) in case that no successful receptions were made within a given maximum time interval.

12 Claims, 2 Drawing Sheets

(51) Int. Cl.
*H04L 12/433* (2006.01)
*H04W 24/04* (2009.01)
*H04L 1/22* (2006.01)
*H04L 1/00* (2006.01)
*H04W 84/18* (2009.01)

(52) U.S. Cl.
CPC .............. *H04W 72/02* (2013.01); *H04L 1/22* (2013.01); *H04L 2001/0095* (2013.01); *H04W 84/18* (2013.01)

(58) Field of Classification Search
CPC ... H04L 12/433; H04L 12/437; H04L 12/435; H04L 2001/0095
See application file for complete search history.

(56) References Cited

U.S. PATENT DOCUMENTS

| | | | |
|---|---|---|---|
| 2008/0020751 A1 | 1/2008 | Li et al. | |
| 2009/0055909 A1* | 2/2009 | Cheng | H04L 12/433 726/6 |
| 2012/0129470 A1* | 5/2012 | Tandai | H04W 76/14 455/73 |
| 2013/0195022 A1* | 8/2013 | Nguyen | H04B 1/713 370/329 |
| 2015/0036620 A1* | 2/2015 | Lee | H04W 72/082 370/329 |

OTHER PUBLICATIONS

Enrico Gregori et al.; "NETWORKING 2002—Networking Technologies, Services, and Protocols; Performance of Computer and Communication Networks; Mobile and Wireless Communications"; (Second International IFIP-TC6 Networking Conference; Pisa, Italy; May 19-24, 2002 Proceedings; Springer Science & Business Media; pp. 1010-1012).

T L Singal; "Wireless Communications"; Tata McGraw-Hill Education; 2010; pp. 291-292.

Klaus Wehrle, et al.; "Modeling and Tools for Network Simulation"; Springer Science & Business Media; Sep. 22, 2010; pp. 250-251.

Yi Pan et al.; "Ad Hoc and Sensor Networks"; Wireless Networks and Mobile Computing; vol. 2, Nova Science Publishers, Inc.; New York; 2006; pp. 95-97.

International Search Report dated Nov. 16, 2016 issued in International Application No. PCT/EP2016/072195; filed Sep. 19, 2016.

* cited by examiner

COMMUNICATION SYSTEM

The invention relates to communication systems, communication nodes and methods of operating communication systems.

BACKGROUND OF THE INVENTION

German Patent Application DE 10 2012 206 529 A1 discloses a method of operating a token-ring system where communication nodes send signals to allocated upstream communication nodes and receive signals from allocated downstream communication nodes.

OBJECTIVE OF THE PRESENT INVENTION

An objective of the present invention is to provide a method which allows operating a communication systems in a very reliable way.

A further objective of the present invention is to provide a communication system and a communication node that can be operated in a very reliable way.

BRIEF SUMMARY OF THE INVENTION

An embodiment of the invention relates to a method of operating a communication system, wherein each communication node of the communication system tracks a successful reception of data signals and requests a switch and/or switches from a currently used communication channel to another communication channel in case that no successful receptions were made within a given maximum time interval.

An advantage of this embodiment of the invention is that an interruption of a presently used communication channel can be detected very quickly. As soon as a communication node becomes aware that an expected data signal has not been received, a switch to an alternative communication channel may be initiated immediately. Therefore, in case of an interruption of the actually used communication channel, the time span in which the communication nodes remain unconnected, is significantly reduced compared to communication systems which are presently known.

There are various known methods for establishing whether a reception of data signals was successful or not. For instance, reliable methods are described in:

"Wireless Communication Protocols and Resource Optimization for Distributed Control of Power Networks" (Muhammad Tahir, Dissertation, University of Illinois, Chicago, UMI Microform Number 3345496, pages 62-64), "NETWORKING 2002. Networking Technologies, Services, and Protocols; Performance of Computer and Communication Networks; Mobile and Wireless Communications" (Second International IFIP-TC6 Networking Conference, Pisa, Italy, May 19-24, 2002 Proceedings; Enrico Gregori, Marco Conti, Andrew T. Cambell, Guy Omidyar, Moshe Zukerman; pages 1010-1012), "Wireless Communications" (T L Singal, Tata McGraw-Hill Education, 2010, pages 291-292), "Modeling and Tools for Network Simulation" (Klaus Wehrle, Mesut Günes, James Gross; Springer Science & Business Media, Sep. 22, 2010, pages 250-251), "Ad Hoc and Sensor Networks" (Yi Pan, Yang Xiao, Nova Publishers, 2006, pages 95-97), and U.S. Pat. No. 8,533,554 B2

Preferably a reception of a data signal is deemed to be successful if the receiving entity is able to detect the data signal, decode the data signal, and proof the correctness of the data signal by deriving a first check value from the data signal and comparing it to a second check value that is enclosed in the received data signal (e.g., a cyclic redundancy check (CRC) value).

According to a preferred embodiment, all communication nodes communicate directly with each other on the same channel. An advantage of this embodiment is that the communication system does not require any central station or central node, which handles the communication and—in case of a failure—would cause a shut down of the entire system. In other words, the communication system can be self-organized with respect to its member nodes. Even if one or more nodes fail the other nodes may continue their communication.

In case that one or more of the communication nodes fail to make successful receptions within the given maximum time interval on the actual channel, the respective communication nodes send a broadcast signal to all other nodes in order to request the switch from the currently used communication channel to another communication channel.

The broadcast signal is preferably sent on the same channel as the actually used communication channel and/or on a new channel according to a channel sequence that defines the order in which communication channels are switched.

According to a preferred embodiment, at least one communication node, preferably each communication node, of the communication system stores usability information with respect to the communication channels that can be used by the communication system.

At least one communication node, preferably each communication node, of the communication system preferably evaluates stored usability information and determines a channel sequence that defines the order in which communication channels are switched in case that the currently used communication channel is interrupted or fails to provide the given minimum communication quality.

At least one communication node, preferably each communication node, may regularly scan the communication channels of the communication system in order to determine the current usability of the communication channels and to update stored usability information.

At least one communication node, preferably each communication node, preferably measures the electromagnetic radiation on each of the currently unused communication channels and determines the current usability of the communication channels based on the measurement values.

At least one communication node, preferably each communication node, preferably sends data signals to at least one other communication node of the communication system and receives data signals from at least one other communication node of the communication system during communication time slots and scans the communication channels at times outside of the communication time slots.

At least one communication node, preferably each communication node, preferably informs at least one other communication node about communication channels that are usable according to its stored usability information.

At least one communication node, preferably each communication node, preferably informs at least one other communication node about communication channels that are unusable according to its stored usability information.

According to a preferred embodiment each of the communication nodes of the communication system receives usability information or parts thereof stored by at least one other communication node and uses the received information to update or amend its stored usability information, and each communication node of the communication system sends its stored usability information or parts thereof to at least one other communication node of the communication system in order to allow the other communication node to update or amend the stored usability information.

The communication system preferably forms a token-ring system wherein each communication node directly or indirectly—i.e. via one or more other communication nodes that function as relay nodes—sends data signals to an allocated downstream communication node and receives data signals from an allocated upstream communication node.

In a further preferred embodiment, each communication node receives usability information or parts thereof from the respective upstream node and uses the received information to update or amend its stored usability information, and each communication node sends its stored usability information or parts thereof to the respective downstream node in order to allow the downstream node to update the stored usability information.

In a further preferred embodiment, the data signals comprise data packets.

The communication node preferably sends a broadcast signal to request a change of the communication channel if the communication node does not receive an expected data signal from the allocated upstream communication node within a given maximum time interval.

A further embodiment of the invention relates to a communication node for a communication system. The communication node is preferably capable of communicating on the basis of any of a plurality of communication channels. Further, the communication node is preferably configured to store usability information regarding the communication channels, and to switch and/or request a switch from a currently used communication channel to another communication channel in case that the currently used communication channel is interrupted or fails to provide a given minimum communication quality.

The communication node is preferably configured to communicate directly with any or all of the other nodes of the communication system on the basis of the same communication channel used by the other nodes during successful reception of data signals. An advantage of this embodiment is that the communication system does not require any central station or central node, which handles the communication and—in case of a failure—would cause a shut down of the entire system. The communication system can therefore be self-organized with respect to its member nodes. Even if one or more nodes fail the other nodes may continue their communication.

The communication node may be further configured to send a broadcast signal to all other nodes in order to request the switch from a currently used communication channel to another communication channel in case that no successful receptions were made within a given maximum time interval.

The communication node preferably comprises a processor unit and a memory that stores usability information regarding each of the communication channels. The memory may further store a control program which—after activation—programs the processor to switch and/or request a switch from a currently used communication channel to another communication channel in case that the currently used communication channel is interrupted or fails to provide a given minimum communication quality. The memory may further comprise a software module, hereinafter also referred to as channel sequence software module, that defines a given scheme to determine a channel sequence based on the usability information.

A further embodiment of the invention relates to a communication system. The communication system preferably comprises two or more communication nodes as described above.

The communication system is preferably a token-ring system and the communication nodes are preferably broadcast-type communication nodes.

The communication nodes of the communication system are preferably configured to communicate directly with any or all of the other nodes of the communication system on the basis of the same communication channel that is used by the other nodes during successful reception of data signals. An advantage of this embodiment is that the communication system does not require any central station or central node, which handles the communication and—in case of a failure—would cause a shut down of the entire system. The communication system can be self-organized with respect to its member nodes and the choice of the actual communication channel. Even if one or more nodes fail the other nodes may continue their communication.

The communication nodes may be further configured to send a broadcast signal to all other nodes in order to request the switch from a currently used communication channel to another communication channel in case that no successful receptions were made within a given maximum time interval.

BRIEF DESCRIPTION OF THE DRAWINGS

In order that the manner in which the above-recited and other advantages of the invention are obtained will be readily understood, a more particular description of the invention briefly described above will be rendered by reference to specific embodiments thereof which are illustrated in the appended drawings. Understanding that these drawings depict only typical embodiments of the invention and are therefore not to be considered to be limiting of its scope, the invention will be described and explained with additional specificity and detail by the use of the accompanying drawings in which.

DETAILED DESCRIPTION OF THE PREFERRED EMBODIMENT

The preferred embodiment of the present invention will be best understood by reference to the drawings. It will be readily understood that the present invention, as generally described and illustrated in the figures herein, could vary in a wide range. Thus, the following more detailed description of the exemplary embodiments of the present invention, as represented in the figures, is not intended to limit the scope of the invention, as claimed, but is merely representative of presently preferred embodiments of the invention.

Figure 1:
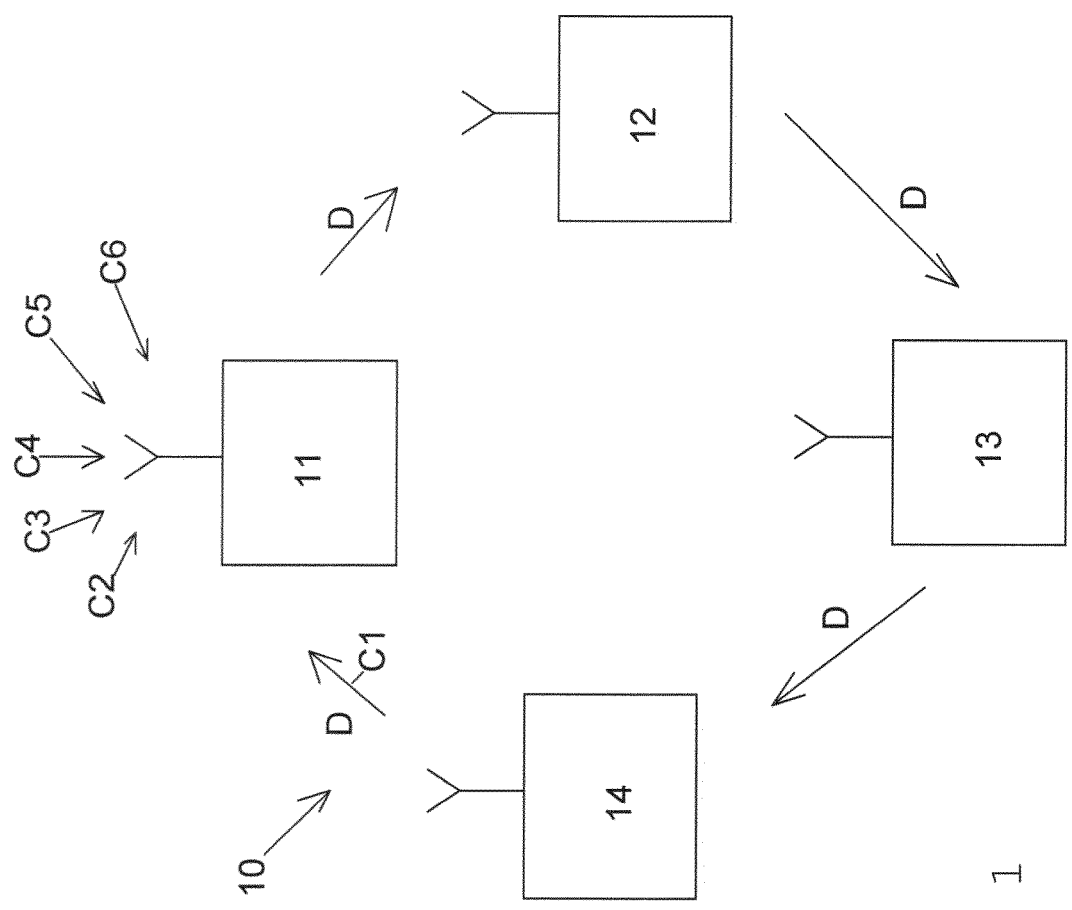
FIG. 1 shows an exemplary embodiment of a communication system according to the present invention and FIG. 2 shows an exemplary embodiment of a communication node according to the present invention.

FIG. 1 shows an exemplary embodiment of a communication system 10 according to the present invention. The communication system 10 comprises a plurality of broadcast-type communication nodes 11, 12, 13, and 14.

The communication system 10 forms a token-ring system wherein each communication node directly or indirectly— i.e. via one or more other communication nodes—sends data signals D to an allocated downstream communication node and receives data signals D from an allocated upstream communication node. The data signals D are illustrated by arrows in FIG. 1. The arrows' directions indicate the direction of the communication and thus define for each communication node which of the other communication nodes is the respective upstream node and the respective downstream node.

In FIG. 1, it is assumed that communication nodes 11, 12, 13 and 14 presently use a communication channel C1.

Figure 2:
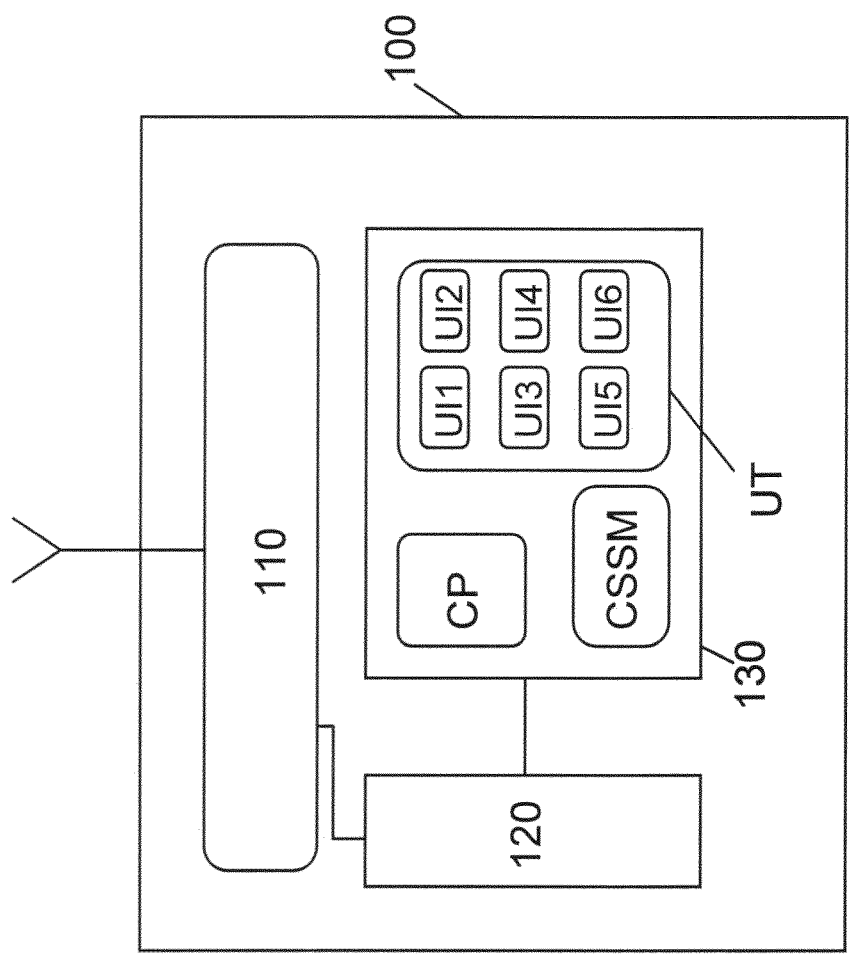

FIG. 2 shows an exemplary embodiment of a communication node 100 that can form any of the communication nodes 11, 12, 13 or 14 in the communication system 10 of FIG. 1.

The communication node 100 comprises a transceiver 110 capable of transmitting and receiving electromagnetic radiation, a processor unit 120 and a memory 130. The memory 130 stores a control program CP that allows the processor unit 120 to operate as explained further below.

The memory 130 also stores a usability table UT that contains usability information regarding each communication channel that can be used by the communication node 100. For example, the communication node 100 may be configured to communicate on any of six given communication channels C1-C6. In this case, the usability table UT comprises usability information UI1, UI2, UI3, UI4, UI5 and UI6 for each of the six communication channels C1-C6, respectively.

Each usability information UI1, UI2, UI3, UI4, UI5 and UI6 at least indicates whether or not the respective communication channel C1-C6 can presently be used or not. For instance, a binary information "1" may indicate that the respective communication channel can presently be used, and a binary information "0" may indicate that the respective communication channel cannot be used. Of course, the assignment of the binary information "1" and "0" might also be inverse.

Referring again to FIG. 1, the communication nodes 11, 12, 13 and 14 may operate as follows:

Each communication node 11, 12, 13 and 14 tracks the successful reception of data signals D that are transmitted on the presently used communication channel, e. g communication channel C1. In case that data signals D are received on time, i.e. within a given maximum time interval, the communication nodes 11, 12, 13 and 14 continue to communicate on this communication channel C1.

In order to prepare for a situation where the presently used communication channel C1 is interrupted or disturbed, the communication nodes 11, 12, 13 and 14 regularly scan all of the other five communication channels C2-C6 of the communication system 10 and determine the current usability of the other communication channels C2-C6.

During the scanning procedure, the communication nodes 11, 12, 13 and 14 may measure the electromagnetic radiation P(C) on each of the currently unused communication channels C2-C6 and evaluate the measurement results P(C) for each communication channel. For instance, in case of a frequency domain multiplexing system P(C) can be obtained by using the following formula :

$$P(C) = \int_{fmin(C)}^{fmax(C)} P(f)df$$

wherein C designates the respective communication channel C2, C3, C4, C5 or C6, fmax(C) the upper end of the frequency band of the respective communication channel, fmin(C) die lower end of the frequency band of the respective communication channel, and P(f) the radiation density.

In case of a time domain multiplexing system, P(C) can be obtained by using the following formula:

$$P(C) = \int_{tmin(C)}^{tmax(C)} P(t)dt$$

wherein C designates the respective communication channel C2, C3, C4, C5 or C6, tmax(C) the end of the time slot assignment of the respective communication channel, tmin(C) the beginning of the time slot assignment of the respective communication channel, and P(t) the radiation density.

In case of multiplexing systems that divide the channels in other domains (e.g. space, code, etc), P(C) can be obtained accordingly.

Preferably, a communication channel is deemed to be usable for communication if the electromagnetic radiation on the respective communication channel is below a given threshold Pmax. Accordingly, a communication channel is preferably deemed to be unusable for communication if the electromagnetic radiation on the respective communication channel exceeds the given threshold Pmax:

P(C)>Pmax⇒UI(C)="0" (communication channel unusable)

P(C)<Pmax⇒UI(C)="1" (communication channel usable)

Based on the evaluation of the measurement results, the usability information UI1-UI6 stored in memory 130 (see FIG. 2) can be updated.

In FIG. 1, the scanning of the other communication channels

C2-C6 is illustrated with respect to communication node 11, only.

In order to regularly update the stored usability information, the communication nodes 11, 12, 13 and 14 preferably scan the communication channels C2-C6 on a regular basis. For instance, the communication nodes may scan the communication channels C2-C6 during all time slots where they do not expect the reception of data signals D from other communication nodes.

Furthermore, each communication node 11, 12, 13 and 14 may evaluate the stored usability information in order to determine a channel sequence that defines the order in which communication channels are planned to be switched in case that the currently used communication channel is interrupted or fails to provide a given minimum communication quality.

Assuming for instance a situation where the communication channel C1 is the presently used communication channel and the usability tables UT stored in the memory 130 of the communication nodes 11, 12, 13 and 14 contain the following usability information:

| communication channel | usability information UI(C) | priority |
|---|---|---|
| C1 | 1 | 1 |
| C2 | 1 | 2 |
| C3 | 0 | 3 |
| C4 | 1 | 4 |
| C5 | 0 | 5 |
| C6 | 1 | 6 |

According to the usability table UT above, the communication channels C2, C4 and C6 are presently usable and the communication channels C3 and C5 are presently unusable. Based on these table entries, each of the communication nodes 11, 12, 13 and 14 may determine a channel sequence, for instance the channel sequence C2-C4-C6, which can be used for selecting a new communication channel in case that the presently used communication channel C1 is interrupted.

The channel sequence is preferably determined based on a given scheme that is applied by all communication nodes 11, 12, 13 and 14 in order to guarantee that all communication nodes determine the channel sequence in the same way and obtain the same result. The given scheme may be implemented in a software module CSSM ("channel sequence software module"), which is stored in the memory 130 (see FIG. 2) and responsible for determining the channel sequence based on the table entries of the usability table UT.

The given scheme may be based on a priority that is defined for each communication channel, e.g. as indicated in the exemplary table above. The priorities may define for instance that communication channel C2 is preferred over communication channel C4, and communication channel C4 is preferred over communication channel C6: Therefore, in the example presented above, the channel sequence C2-C4-C6 results.

In order to avoid that usability information stored in the memories of the communication nodes 11-14 differ and therefore differing channel sequences might be generated, the communication nodes 11-14 preferably exchange their stored usability information or parts thereof and use received information to update or amend its stored usability information.

If for instance the communication node 13 stores the usability information UI4="0" and all the other communication nodes 11, 12, and 14 store the usability information UI4="1" (as indicated above in the table), the other communication nodes 11, 12, and 14 preferably update their usability table by downgrading the usability information UI4 to UI4="0", because a communication on communication channel C4 would not be possible for communication node 13:

| communication channel | usability information UI(C) | priority |
|---|---|---|
| C1 | 1 | 1 |
| C2 | 1 | 2 |
| C3 | 0 | 3 |
| C4 | 0 | 4 |
| C5 | 0 | 5 |
| C6 | 1 | 6 |

The exchange of usability information between the communication nodes makes sure that all communication nodes refer to the same usability table when they determine their channel sequence.

With respect to the updated usability table above, for instance, the channel sequence C2-C6 would be determined because communication channel C2 is preferred over communication channel C6. Accordingly, if any of the communication nodes does not receive data signals D within the given maximum time interval it will request a switch and/or will switch from the currently used communication channel C1 to the new communication channel C2. If, for whatever reason, the communication fails on channel C2, channel C6 can be tried thereafter.

The invention claimed is:

1. A method of operating a communication system that forms a token-ring system, wherein each communication node of the communication system tracks a successful reception of data signals and requests a switch and/or switches from a currently used communication channel to another communication channel in case that no successful receptions were made within a given maximum time interval, wherein during successful reception of data signals, all communication nodes directly communicate with each other on the same channel, and in case that one or more of the communication nodes fail to make successful receptions within the given maximum time interval on the actual channel, the respective communication nodes send a broadcast signal to all other nodes in order to request the switch from the currently used communication channel to another communication channel, wherein the broadcast signal is sent on the same channel as the actually used communication channel and/or on a new channel according to a channel sequence that defines the order in which communication channels are switched, said channel sequence being determined on evaluated stored usability information; and wherein at least one communication node, preferably each communication node, of the communication system stores said usability information with respect to the communication channels that can be used by the communication system.

2. The method of claim 1 wherein one or more communication nodes, of the communication system evaluates the stored usability information and determines a channel sequence that defines the order in which communication channels are switched in case that the currently used communication channel is interrupted or fails to provide the given minimum communication quality.

3. The method of claim 2 wherein one or more communication nodes, regularly scans the communication channels of the communication system in order to determine the current usability of the communication channels and to update the stored usability information.

4. The method of claim 2 wherein one or more communication nodes, measures the electromagnetic radiation on each of the currently unused communication channels and determines the current usability of the communication channels based on the measurement values.

5. The method of claim 3 wherein one or more communication nodes, sends data signals to at least one other communication node of the communication system and receives data signals from at least one other communication node of the communication system during communication time slots and scans the communication channels at times outside of the communication time slots.

6. The method of claim 1 wherein one or more communication nodes, informs at least one other communication node about communication channels that are usable according to its stored usability information.

7. The method of claim 1 wherein-one or more communication nodes, informs at least one other communication node about communication channels that are unusable according to its stored usability information.

8. The method of claim 1 wherein each of the communication nodes of the communication system receives usability information or parts thereof stored by at least one other communication node and uses the received information to update or amend its stored usability information, and each communication node of the communication system sends its stored usability information or parts thereof to at least one other communication node of the communication system in order to allow the other communication node to update or amend the stored usability information.

9. The method of claim 1 wherein each communication node directly or indirectly via one or more other communication nodes that function as relay nodes -sends data signals to an allocated downstream communication node and receives data signals from an allocated upstream communication node.

10. The method of claim 9 wherein each communication node receives usability information or parts thereof from the respective upstream node and uses the received information to update or amend its stored usability information, and each communication node sends its stored usability information or parts thereof to the respective downstream node in order to allow the downstream node to update the stored usability information.

11. The method of claim 10 wherein the communication node sends a broadcast signal to request a change of the communication channel if the communication node does not receive an expected data signal from the allocated upstream communication node within a given maximum time interval.

12. The method of claim 1 wherein a reception of a data signal is deemed to be successful if the receiving entity is able to detect the data signal, decode the data signal, and proof the correctness of the data signal by deriving a first check value from the data signal and comparing it to a second check value that is enclosed in the received data signal.

* * * * *